(No Model.)
H. H. CARPENTER.
ELECTRIC LAMP FOR STREET LIGHTING.
No. 450,000. Patented Apr. 7, 1891.
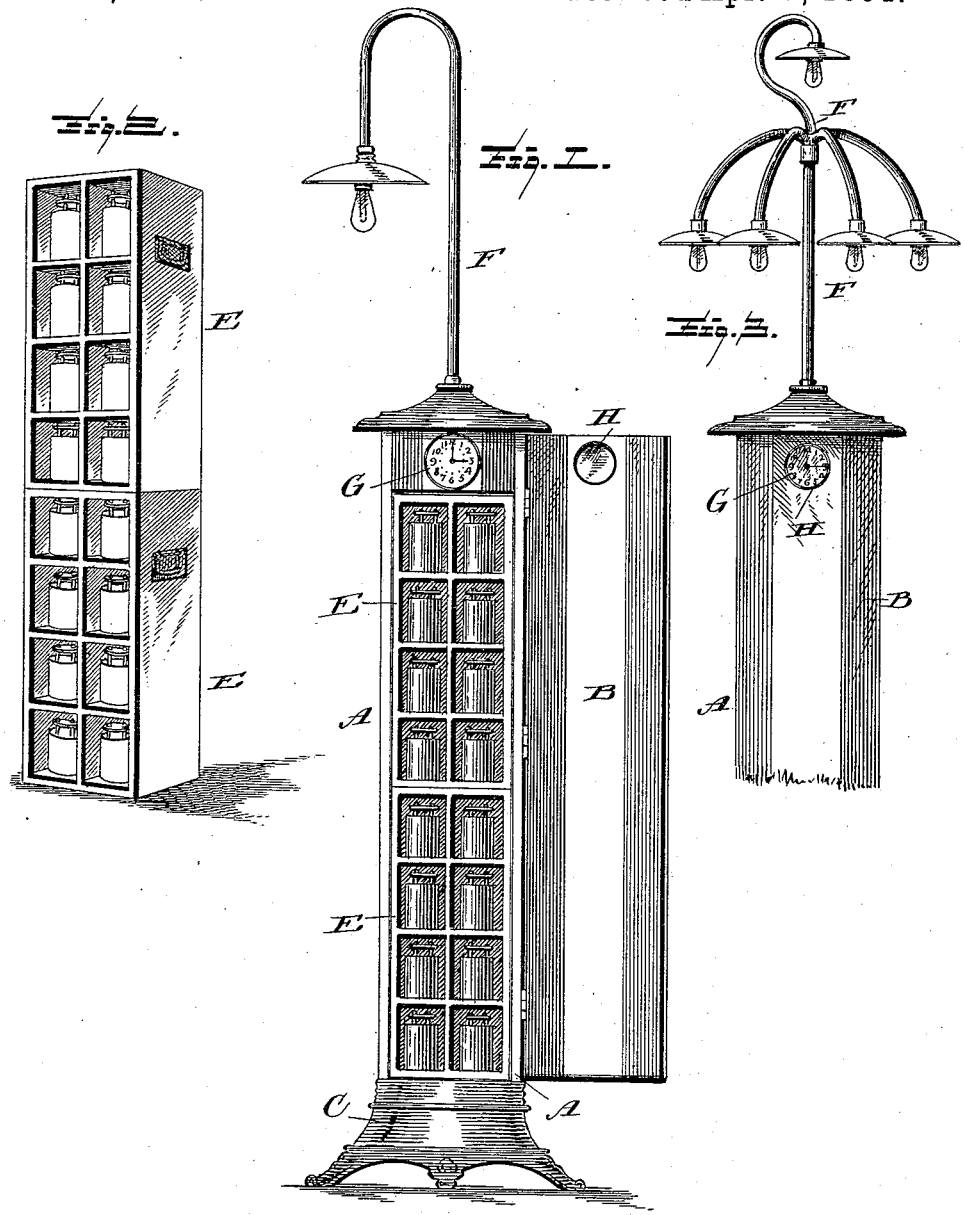

UNITED STATES PATENT OFFICE.

HIRAM H. CARPENTER, OF CHICAGO, ILLINOIS.

ELECTRIC LAMP FOR STREET LIGHTING.

SPECIFICATION forming part of Letters Patent No. 450,000, dated April 7, 1891.

Application filed February 19, 1891. Serial No. 382,048. (No model.)

*To all whom it may concern:*

Be it known that I, HIRAM H. CARPENTER, of the city of Chicago, in the State of Illinois, have invented a new and useful Improvement in Electric Lamps for Street Lighting and Outside Illumination, of which the following is a specification.

It is my object to provide a portable electric lamp and lamp-post suitable for street lighting and for outside use generally, containing in itself all the devices and appliances needed to furnish electric light. To this end I provide a substantial case of considerable height (say five feet or more) and limited area in cross-section, which forms the main stem of the post and which contains shelves or movable interior cases for the reception of a number of secondary-battery cells and is closed by a door. The top of this case is surmounted by the bracket carrying the electric-lamp holder or holders, the circuit between the batteries and the lamp or lamps being controlled by a clock time-switch, the dial of which is mounted upon the exterior of the main stem of the post in position to be covered by the door thereof, which has in it a window or bull's-eye, through which the dial is visible.

In the accompanying drawings, Figure 1 is a view of the complete device with the door open. Fig. 2 is a view of battery-cases removed from the main stem of the post. Fig. 3 is a view of the upper part of the post, showing the bracket or standard provided with a plurality of lamps.

A is the hollow box-like main stem of the lamp-post, provided with a hinged door B, through which access may be had to its interior, and with a base C. The stem and base may be made of metal or other suitable material, and this part of the post is, say, about five feet in height. The stem receives the secondary batteries D, by which current is supplied to the lamp or lamps, these batteries being contained in one or more portable cases E. In the present instance there are two of such cases, for convenience of handling, of such size that when placed in the stem A, one on the other, they will neatly fill the interior of the same. The batteries are connected in series, so as to give the required voltage, and they are of a capacity to supply the lamp or lamps for a number of hours.

With the battery which I propose to employ an assemblage of batteries, such as represented in the drawings, will weigh, say, about two hundred pounds. This will permit the ready handling of the battery-cases, and will at the same time be sufficient to give the post all needed stability and steadiness.

Above the stem A of the post extends the metallic lamp-carrying bracket or stand F. The bracket in Fig. 1 carries one lamp, and this is the form which is designed for street-lighting purposes. In Fig. 3 the bracket or stand carries a number of lamps, six in all, and this is a form which can advantageously be used for lighting lawns and the like.

The circuit between the batteries and the lamp or lamps is controlled by a time-switch, the clock-movement of which has its dial and hands upon the exterior of the stem A, as indicated at G, above the battery-space therein, and in a position where the dial will be covered by the door when the latter is closed, the door being placed upon the side of the stem and made of a sufficient height for this purpose; and in that portion of the door which covers the dial is formed a window or bull's-eye H, through which the clock is visible when the door is shut. The clock thus serves as a time-piece, while it is at the same time protected and shielded from outside interference.

I have not deemed it necessary to represent the mechanical and electrical details of the time-switch, since a device of this kind is not new with me and is well known in the art. Such a device is shown, for example, in Letters Patent No. 393,183, of November 20, 1888.

Having described my improvement and the manner in which the same is or may be carried into effect, I state in conclusion that I am aware that an electric lamp comprising a base containing a secondary battery and surmounted by a standard carrying the lamp-holder is not new, and such a structure is not broadly claimed by me.

What I do claim, and desire to secure by Letters Patent, is—

A portable electric lamp and post for street lighting and like purposes, comprising the upright box-like stem A, with its base C, door B, arranged upon the side of the stem A and formed to cover the dial, the secondary batteries contained in said stem, the lamp-carrying bracket or standard F, and a clock time-switch whose dial G is upon the exterior of the stem A, these parts being constructed and arranged together as herein shown and described.

In testimony whereof I affix my signature in presence of two witnesses.

HIRAM H. CARPENTER.

Witnesses:
 EWELL A. DICK,
 F. B. KEEFER.